United States Patent
Bergqvist et al.

(10) Patent No.: US 6,694,085 B2
(45) Date of Patent: Feb. 17, 2004

(54) DEVICE FOR FEEDING OPTICAL FIBRES INTO A DUCT

(75) Inventors: Erik Bergqvist, Bergsjö (SE); Bertil Olsson, Näsviken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 09/932,979

(22) Filed: Aug. 21, 2001

(65) Prior Publication Data

US 2002/0028058 A1 Mar. 7, 2002

Related U.S. Application Data

(63) Continuation of application No. PCT/SE00/00332, filed on Feb. 18, 2000.

(30) Foreign Application Priority Data

Feb. 22, 1999 (SE) ................................................ 9900623

(51) Int. Cl.$^7$ ................................................ G02B 6/00
(52) U.S. Cl. ...................................... 385/147; 385/134
(58) Field of Search ............................... 385/147, 134, 385/53, 65, 84, 83, 137; 226/7; 239/322; 254/134.4, 134.3 R, 134.3 FT

(56) References Cited

U.S. PATENT DOCUMENTS 4,640,576 A * 2/1987 Eastwood et al. ...... 385/111 X
5,456,450 A * 10/1995 Reeve et al. ............. 254/134.4
6,198,871 B1 * 3/2001 Gregor et al. ............. 385/147

FOREIGN PATENT DOCUMENTS

| EP | 0508016 A1 | 10/1992 |
| GB | 2207562 A | 2/1989 |
| JP | 61-148012 | 7/1986 |
| JP | 10044786 | 2/1998 |

* cited by examiner

Primary Examiner—Lynn Feild
Assistant Examiner—Son V. Nguyen

(57) ABSTRACT

A device for feeding optical fibers into a tubular element, duct, or the like. For ease of handling, the fiber feeding device includes a channel into which there can be inserted a bar which includes one or more longitudinally extending blow passages, where each passage has a cross-section that is adapted to a given type of optical fiber. Holes are provided in the bottom surface of the channel close to its respective rear and front edges, for delivering and removing compressed air used to advance the optical fiber. With the optical fiber placed in the blow passage in the bar, the optical fiber in said passage will be advanced when compressed air is delivered through the holes in the rear edge of the bar, by virtue of the blow passage functioning as a Venturi tube where a leakage flow exerts an ejector effect on the optical fiber to promote advancement of said fiber through the blow passage.

8 Claims, 2 Drawing Sheets

DEVICE FOR FEEDING OPTICAL FIBRES INTO A DUCT

This application is a continuation of International Application No. PCT/SE00/00332 filed on Feb. 18, 2000, which International Application was published by the International Bureau in English on Aug. 31, 2000.

BACKGROUND OF THE INVENTION

The present invention relates to a fibre feeding device for feeding optical fibres into a tubular element or into some corresponding element, either singly, loosely or closely connected together, this latter being preferred.

It is known to install optical fibres by means of a blowing technique. In order to allow an optical fibre or several optical fibres contained in an optical fibre ribbon to be blown into a tubular element, duct, or the like, it is essential that the friction between the optical fibre or fibre ribbon and the inner surface of the tubular element is very low, that the presence of static electricity is negligible, and that the air resistance is sufficiently large to enable the optical fibre(s) or fibre ribbon to be advanced even at moderate air propulsion speeds. Hitherto, the solution to this problem has been achieved by applying to the optical fibre(s) 1 or to the optical fibre ribbon a diameter-increasing layer 2 that includes friction reducing material. In the case of mutually combined or closely connected optical fibres 3, 4, several of these fibre combinations have been orientated in a rotational-symmetrical bundle so as to have the same flexural resistance in all planes, and have been provided with a diameter-increasing layer 5, 6 of glass beads, for instance. In order to be able to use optical fibre ribbon techniques 7–9 and utilise the advantages that this would afford in respect of welding and the establishment of electrical contacts without requiring additional material for rounding the cross-section of the ribbon, and for reducing friction and increasing air resistance, a thin Kevlar® wire or filament 10 may be wound around the optical fibre ribbon. This wire can be readily removed at the ends of the optical fibres at a later time, when the ends are to be welded or when electrical connections shall be established. See FIGS. 1A–G.

When an optical fibre 11 or an optical fibre ribbon shall be fed into a tubular element, e.g. ducting, with the aid of compressed air, the optical fibre or ribbon is fed by an optical fibre feeding device into a pressurised space 12 that is connected to the tubular element 13 into which the optical fibre shall be blown. In so doing, it is necessary to apply some form of force that will overcome the backward ejection force acting on the optical fibre in a direction opposite to the feed direction. This has been achieved in the case of several systems, by allowing the optical fibre 11 to pass between two feed rollers 14, 15 that have a soft surface coating. These rollers or wheels may be electrically operated, although they may also conceivably be operated by the pressured air used to propel the optical fibre, so as not to damage the fibre should it be prevented from moving along the duct for some reason or other. A pressure sensor 16 may be provided in the space 12 so as to detect any pressure changes that would result from forward movement of the fibre through the duct being prevented. An optical fibre feeding device designed to operate in accordance with this fibre feeding technique would be relatively complicated and would also require the supply of electrical energy in addition to the compressed air supply for propelling the optical fibre. See FIG. 2.

The aforesaid backward ejection force in the duct can be partially overcome with the aid of an ejector effect generated by the compressed air 17 supplied, by allowing a leakage flow 18 to pass through an optical fibre blow pipe 19 that is designed to function as a Venturi tube, where the air velocity is high and the pressure is low. The blow pipe may be provided with adjustable outlet valves 20 on the downstream side, for controlling the leakage flow. In this way, the optical fibre or fibre ribbon is subjected to an additional propulsion force when introduced into the blow pipe. The leakage flow results in a lower pressure in the blow pipe, a factor which may allow the blow length to be reduced. See FIG. 3.

BRIEF SUMMARY OF THE INVENTION

With the intention of simplifying handling of an optical fibre feeding device that includes a blowing passage for feeding one or more optical fibres into a tubular element, duct or the like, the blow passage can be opened to allow different types of optical fibres to be fed thereinto. The optical fibre feeding device comprises a body that includes a groove or channel into which there can be inserted a bar that includes one or more longitudinally extending blow passages, where the cross-section of each passage is adapted for a given type of optical fibre. Holes for delivering and removing compressed air used to propel the optical fibre(s) are provided in the bottom surface of the groove or channel in the close proximity of its respective rear and front edges. With an optical fibre placed in the blow passage and with the bar placed in the groove/channel in the body of said device, the optical fibre will be propelled forwards when compressed air is delivered through the holes at the rear edge of the groove/channel, by virtue of the blow passage functioning in the manner of a Venturi tube, wherewith a small leakage flow in the blow passage will cause transportation of the optical fibre through the fibre feeding device and into a blow pipe through the medium of an ejector effect. Because the bar is removable and is provided with grooves or channels of mutually different sizes, the fibre feeding device can be used for different types of optical fibres and also enables optical fibres that have already been connected electrically to be fed into the tubular element or duct. According to the invention, the blow passages may be given a rectangular cross-section, so as to enable a non-rounded optical fibre ribbon to be blown into the tubular element or duct by means of the fibre feeding device.

The invention will now be described in more detail with reference to a preferred embodiment thereof and also with reference to the accompanying drawings.

BRIEF DESCRIPTION OF THE INVENTION

Figure 1:
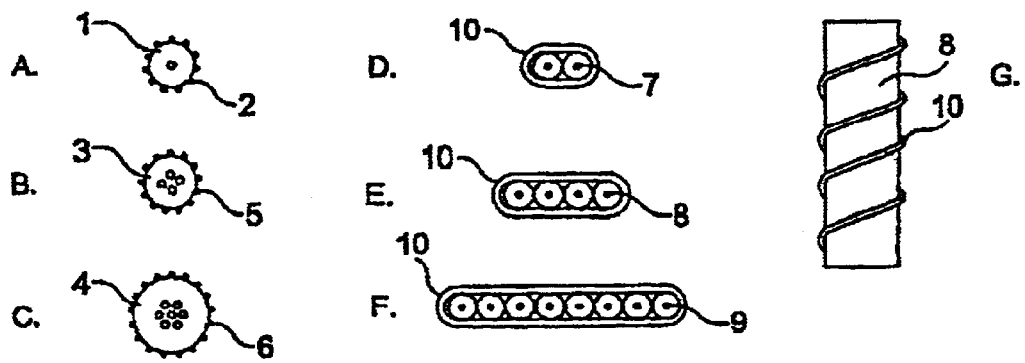
FIGS. 1A–G illustrate conventional optical fibres whose surfaces include friction reducing means and/or air resistance increasing means, and an encased optical fibre ribbon.
Figure 2:
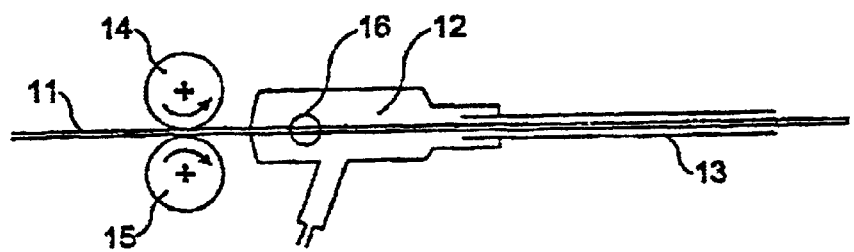
FIG. 2 illustrates an optical fibre feeding device.
Figure 3:
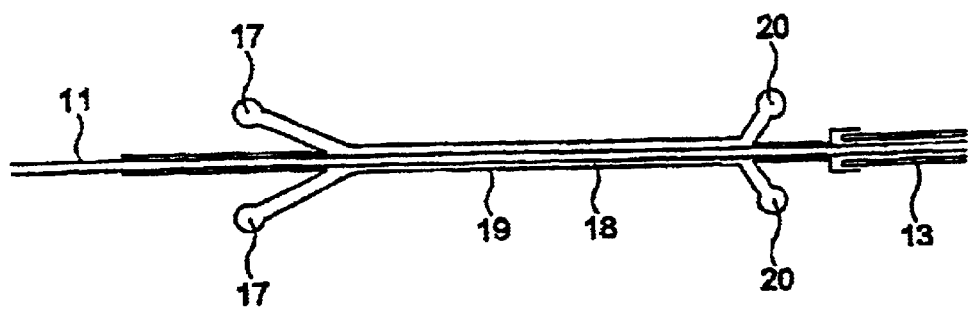
FIG. 3 illustrates the principle of advancing optical fibres with the aid of a Venturi technique.
Figure 4:
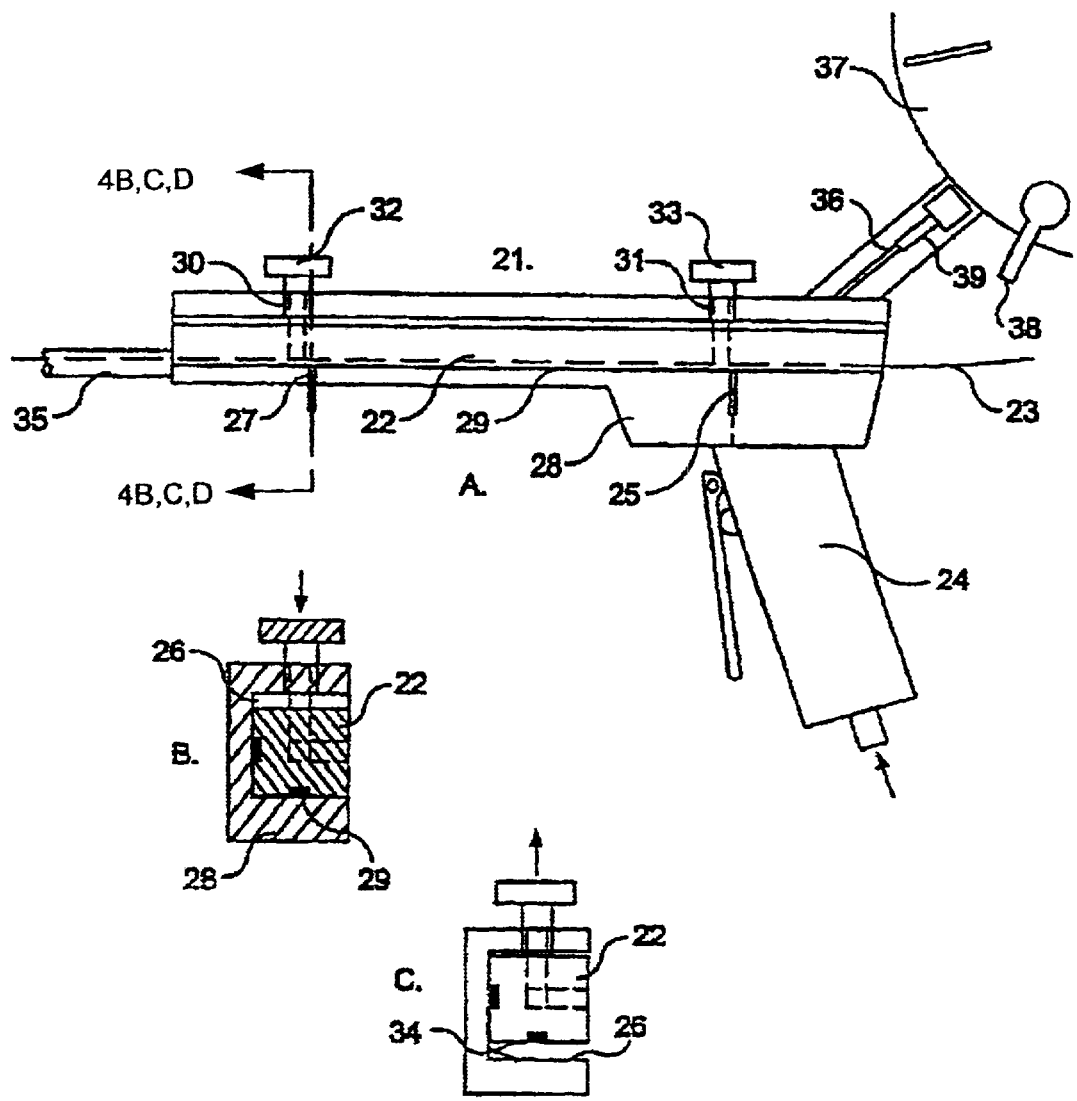
FIGS. 4A–D illustrate an inventive optical fibre feeding device, including three cross-sectional views of the body of the device.

FIGS. 4A–D illustrate schematically an inventive optical fibre feeding device 21 that includes a removable bar 22 for in-feeding different types of optical fibre ribbons 23. The device includes an adjustable compressed-air connection 24 in the form of a pistol grip, which is connected to one end of the fibre feeding device. This compressed air connection enables compressed air to be delivered to one or more holes 25 at one end of the bottom surface of a passage 26 in the feed device. One or more holes 27, which may optionally be adjustable, are provided at the other end of said passage and connected with a region outside said device for evacuating air therefrom. The bar 22 has an essentially square cross-sectional shape and can be inserted into the passage 26 in the body 28 of said device and includes on at least one long side a groove 29 which is intended to function as a blow passage or channel for an inserted optical fibre when the bar is placed in the body of said device, in this regard, the cross-section of the groove 29 is adapted to fit a specific optical fibre or optical fibre ribbon for advancement of the fibre or ribbon with the bar placed in said body. The upper side of the body 28 includes threaded holes 30, 31 which coact with at least two tightening screws 32, 33 for securing the bar 22 in the passage/channel 26. The screws enable the position of the passage/channel in the body to be adjusted, i.e. the groove 29 (blow passage) can be opened for insertion of an optical fibre ribbon or closed for forward feeding of said ribbon. In the illustrated case, the device includes a spring 34 positioned between bar and body for simplifying handling of the optical fibre, by enabling the bar to be lifted away from its abutment surface with a spring force and an optical fibre to be easily removed from or placed into the groove 29 (blow passage). An optical fibre blow pipe 35 can then be readily connected to the fibre feeding device, by clamping the pipe firmly between the body 28 and the bar 22. Bars that include blow passages of mutually different cross-sections can be used with one and the same body, therewith enabling ribbons/cables of mutually different cross-sections to be fed into the tubular element/duct by means of the inventive device.

The installation of optical fibres can be further simplified by providing the fibre feeding device with a simple holding means in the form of a collapsible arm 36 for supporting a drum 37 or the like on which optical fibres have been wound. When an inventive optical fibre feeding device is connected to a drum that carries optical fibres, optical fibres can easily be installed by one single person. The inventive fibre feeding device also enables optical fibre cables that have already been connected electrically to be fed into a tubular element/duct in predetermined lengths, wherewith the bar is raised to expose the blow passage when the electrical connection is located on the front end of the cable. When the electrical connection is located on the rear end of the cable, this end of the cable can be supported by the drum together with an optical fibre cable/ribbon of given length. When the optical fibre cable has been fed into the blow pipe, there is immediately obtained an established optical fibre connection that can be connected directly to an existing outlet, such as a wall outlet in a living space.

The arm 36 holding the drum 37 may be provided with a recording device 38 which records the length of optical fibre that has been blown into the duct. The device 38 may, for instance, function to optically register a mark on one side of the drum so as to determine the number of revolutions of the drum when taking optical fibre therefrom and therewith the length of optical fibre unwound from the drum. The arm may also carry a compressed air-driven brake means 39 which functions to stop the drum should feeding of the optical fibre be stopped for some reason or other. The brake means may be activated in response to a pressure change occurring in the blow passage when the optical fibre is unable to move forwards.

It will be understood that the invention is not restricted to the aforedescribed and illustrated exemplifying embodiments thereof and that modifications can be made within the scope of the accompanying claims.

What is claimed is:

1. A device for feeding optical fibers into a tubular element, comprising:

a compressed air-operated feeder in which an optical fiber is advanced with the aid of compressed air delivered via one or more openings to a rear portion of a passage in the feeder, in which the optical fiber is located, wherein said compressed air is evacuated via one or more openings in a forward portion of said passage; and a bar which can be removably inserted into and fixed in the passage, the bar having at least one groove formed in the length of the bar; the groove, in conjunction with a surface of said passage, forming a blow passage having a cross-sectional shape that is adapted to a specific cross-section of optical fiber, such that said specific optical fibers having mutually different cross-sections can be fed into the tubular element with the aid of the same optical fiber feeding device by adjusting the spacing between the bar surface with the groove and the surface of said passage.

2. The device of claim 1, wherein the bar has a generally square cross-section.

3. The device of claim 1, wherein the body of the device includes means for releasing, adjusting and fixing the bar.

4. The device of claim 1, further comprising a spring mechanism disposed between the body and the bar for releasing the bar from its fixed position.

5. The device of claim 1, further comprising a drum for carrying said optical fibers, said drum connected to the device by an arm, wherewith the optical fiber on the drum can be delivered directly from the drum to the device.

6. The device of claim 5, further comprising means for recording rotational movement of the drum, so as to enable a number of optical fiber turns unwound from the drum to be recorded.

7. The device of claim 5, further comprising a brake for stopping rotation of the drum.

8. The device of claim 7, wherein the brake is driven by compressed air and controllable, so that rotation of the drum can be stopped in response to pressure changes in the blow passage.

* * * * *